(12) United States Patent
Macfarlane et al.

(10) Patent No.: US 8,428,875 B2
(45) Date of Patent: Apr. 23, 2013

(54) GPS MANAGEMENT SYSTEM

(75) Inventors: Rodney Macfarlane, Auckland (NZ); Paul Ranford, Auckland (NZ); Mukesh Bhika, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 542 days.

(21) Appl. No.: 12/684,983

(22) Filed: Jan. 11, 2010

(65) Prior Publication Data
US 2011/0169692 A1 Jul. 14, 2011

(51) Int. Cl.
*G01C 21/00* (2006.01)
(52) U.S. Cl.
USPC .................. 701/522; 701/537; 455/456.6
(58) Field of Classification Search .................. 701/522, 701/537, 533, 544, 468; 455/456.1, 456.6
See application file for complete search history.

(56) References Cited

U.S. PATENT DOCUMENTS

| | | | |
|---|---|---|---|
| 5,839,088 A * | 11/1998 | Hancock et al. | 701/468 |
| 6,202,023 B1 * | 3/2001 | Hancock et al. | 701/516 |
| 6,677,894 B2 | 1/2004 | Sheynblat et al. | |
| 6,838,998 B1 * | 1/2005 | Brown et al. | 340/539.2 |
| 6,847,822 B1 * | 1/2005 | Dennison et al. | 455/456.1 |
| 7,353,034 B2 | 4/2008 | Haney | |
| 7,444,238 B1 * | 10/2008 | Opitz | 701/454 |
| 8,060,109 B2 * | 11/2011 | Fomukong et al. | 455/456.1 |
| 2005/0102103 A1 * | 5/2005 | Graulich et al. | 701/213 |
| 2006/0009237 A1 * | 1/2006 | Chen et al. | 455/456.1 |
| 2007/0202888 A1 * | 8/2007 | Brachet et al. | 455/456.1 |
| 2008/0132252 A1 * | 6/2008 | Altman et al. | 455/457 |
| 2008/0194269 A1 * | 8/2008 | Abernethy et al. | 455/456.1 |
| 2009/0258656 A1 | 10/2009 | Wang | |
| 2010/0004005 A1 * | 1/2010 | Pereira et al. | 455/457 |
| 2010/0004857 A1 * | 1/2010 | Pereira et al. | 701/209 |
| 2011/0010336 A1 * | 1/2011 | Johnson et al. | 707/609 |
| 2011/0054776 A1 * | 3/2011 | Petrov et al. | 701/201 |
| 2011/0159884 A1 * | 6/2011 | Chawla | 455/456.1 |

FOREIGN PATENT DOCUMENTS

| | | |
|---|---|---|
| JP | 2007101555 | 4/2007 |
| TW | 200823701 | 6/2008 |

* cited by examiner

*Primary Examiner* — Helal A Algahaim
(74) *Attorney, Agent, or Firm* — Winston Hsu; Scott Margo

(57) ABSTRACT

A method applied to a mobile device having a GPS receiver having access to a network interface is disclosed. When transmitting via the network interface a first command to edit a user location information on the network interface based on a first geo-information from the GPS receiver to update location information displayed on a website, a destination list stored in the mobile device is updated with transmission destination network address and current GPS receiver location information. Stored location information is periodically compared to current GPS receiver locations and when determined that the GPS receiver has moved at least a predetermined distance from the location stored in the destination list, the method transmits via the network interface a second command to edit a user location information on the network interface based on a second geo-information from the GPS receiver to the website to update or invalidate displayed location information.

10 Claims, 9 Drawing Sheets

| Network Address | 000.000.000.000 |
| --- | --- |
| User Name | Dan0037 |
| Password | myPassword |
| Location Data Type | City Name |
| Current Location | Seattle |
| Update Distance (Radius) | 100 miles |
| Update Message | Currently Unknown |
| Misc. | |

GPS MANAGEMENT SYSTEM

BACKGROUND OF THE INVENTION

1. Field of the Invention

The present invention relates to personal navigation devices (PNDs), and more particularly, to a GPS management system for ensuring location information displayed on websites is not wrong even if the PND is not currently connected to the websites.

2. Description of the Prior Art

The art of knowing precisely where one is at any given moment can be accomplished with fair accuracy using Global Navigation Satellite System (GNSS) receivers, for example the NAVSTAR Global Positioning System (GPS) developed by the United States Department of Defense which offers comprehensive positioning satellite coverage around the globe.

A typical GPS receiver will include an antenna for receiving electrical signals transmitted by GPS satellites, and positioning circuitry for determining a position of the GPS receiver from the electrical signals, and generating corresponding position data. The antenna can be integrated into the GPS receiver, or can be connected externally through a wire. A mobile device can integrate the GPS receiver and further means for providing functions that use the position data generated by the GPS receiver.

The mobile device may include an internal map, which can be used in conjunction with the position data generated by the GPS receiver to plot a course or track the mobile device on the map. As mobile devices begin to be equipped with network interface adapters, such as GPRS modems, 3G, 3.5G, 802.11-series, and other wireless network adapters, real-time position and route information are becoming increasingly uploadable via a browser for display on various websites, for example via a map on a blog or a personal page of a social networking site, which can then be viewed over the Internet by friends or others having access to the appropriate pages of the relevant websites.

Although some websites may allow hosting of an application on the appropriate page which continuously updates the location of the user by linking to a server that is automatically uploaded the location information from the corresponding GPS receiver, this solution has some drawbacks. Firstly, some users prefer to display their current location in a way other than a specific spot on a map, perhaps as "work", "home", or a larger area such as a city name. The prior art solution does not offer this ability. Secondly, for security or other reasons, many of the various websites do not allow this kind of application and instead require location information to be received from a logged-on, or at least currently connected user via a browser. However, for various reasons such as not being currently connected to the various websites, the location information being displayed may be incorrect and may result in friends showing up at the incorrect location for a meeting. Lastly, the ability to prioritize location updates to the various websites is lacking also in the prior art.

SUMMARY OF THE INVENTION

A GPS management system for ensuring location information displayed on websites is not wrong even if the mobile device is not currently connected to the websites is disclosed. The GPS management system can be applied to a mobile device having access to a network interface and comprising a GPS receiver or an A-GPS AP. The method includes updating a destination list with transmission destination network address information when transmitting via the network interface a first command to edit a user location information on the network interface based on a first geo-information from the GPS receiver and transmitting via the network interface a second command to edit a user location information on the network interface based on a second geo-information from the GPS receiver to each network address in the destination list only when respective locations indicated in the first and second geo-information differ by a predetermined distance.

The method further includes maintaining the destination list that corresponds the network address with information relevant to the website at the network address, including necessary log-on information so that when the network interface does not currently have access to the website, the claimed GPS management system can access, log-on to, and update location information at all websites in the destination list needing updated as determined by the GPS management system, either automatically or a simplified, perhaps single input of a control interface of the mobile device.

A method of operating an application applied to a mobile device having a GPS receiver or an A-GPS AP is further disclosed. The method includes setting up a list which records addresses of multiple websites and corresponding user names and passwords used to gain access to the multiple websites. A current location of the mobile device is defined according to information from the GPS receiver or A-GPS AP and the current location of the mobile device is transmitted to the multiple websites. Periodically, a new current location of the mobile device is defined according to new information from the GPS receiver or A-GPS AP and the current location previously transmitted to the multiple websites is updated to be the new current location when a distance between the current location and the new current location is over a predefined value.

These and other objectives of the present invention will no doubt become obvious to those of ordinary skill in the art after reading the following detailed description of the preferred embodiment that is illustrated in the various figures and drawings.

DETAILED DESCRIPTION

One of the general ideas of the current disclosure is to provide a GPS management system for a mobile device which forms and manages at least one list of websites that disclose the mobile device user's location on the website, and to provide a simplified method of at least notifying the user when the posted location on one or more of the websites in the list is invalid.

Figure 1:
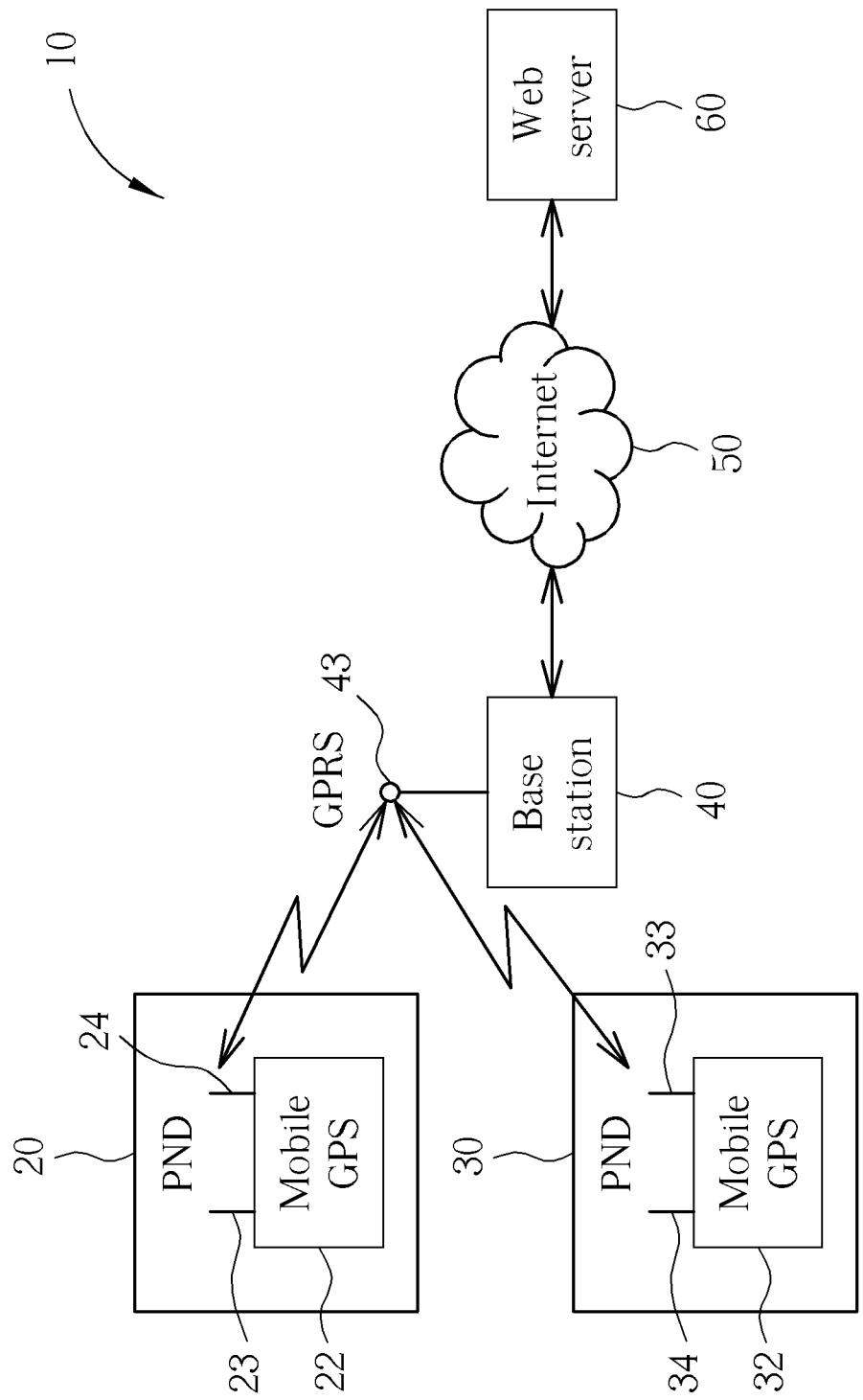
FIG. 1 is a block diagram of a network system according to an embodiment of the application.
Figure 2:
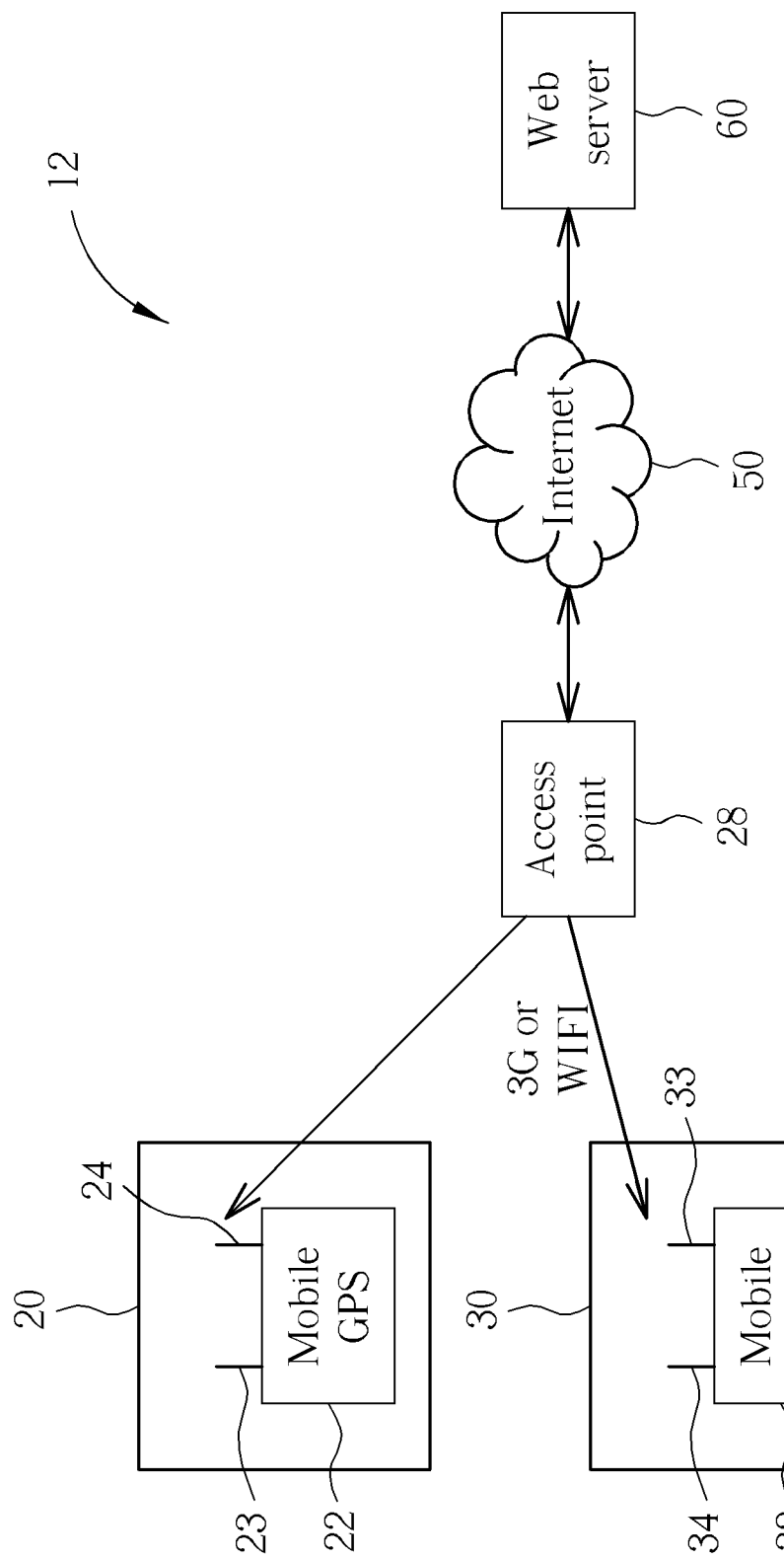
FIG. 2 is a block diagram of another network system according to another embodiment of the application.

Please refer to FIG. 1 that illustrates a General Radio Packet System (GRPS) network system 10 suitable for application of the current disclosure. FIG. 2 illustrates a network system 12 that incorporates WIFI, 3G, 3.5G or another wireless transmission protocol that enables a mobile device to connect to the Internet. The network systems 10, 12 include at least one mobile device 20, 30 capable of wireless communications with a base station 40 or an access point 28. Each mobile device 20, 30 may comprise a mobile GPS receiver 22, 32, (or an A-GPS application program) and each mobile GPS receiver 22, 32 normally comprises a first antenna 23, 24 for receiving GPS related data from orbiting satellites and a second antenna 24, 33 for communication with the base station 40 or access point 28. Both the access point 28 and the base station 40 are connected to the Internet 50, which includes at least one web server 60 hosting a website that can display location information according to a command issued by the mobile device 20, 30 to edit a user location information on the network interface based on geo-information generated by the GPS receiver 22, 32 of the corresponding mobile device 20, 30.

Figure 3:
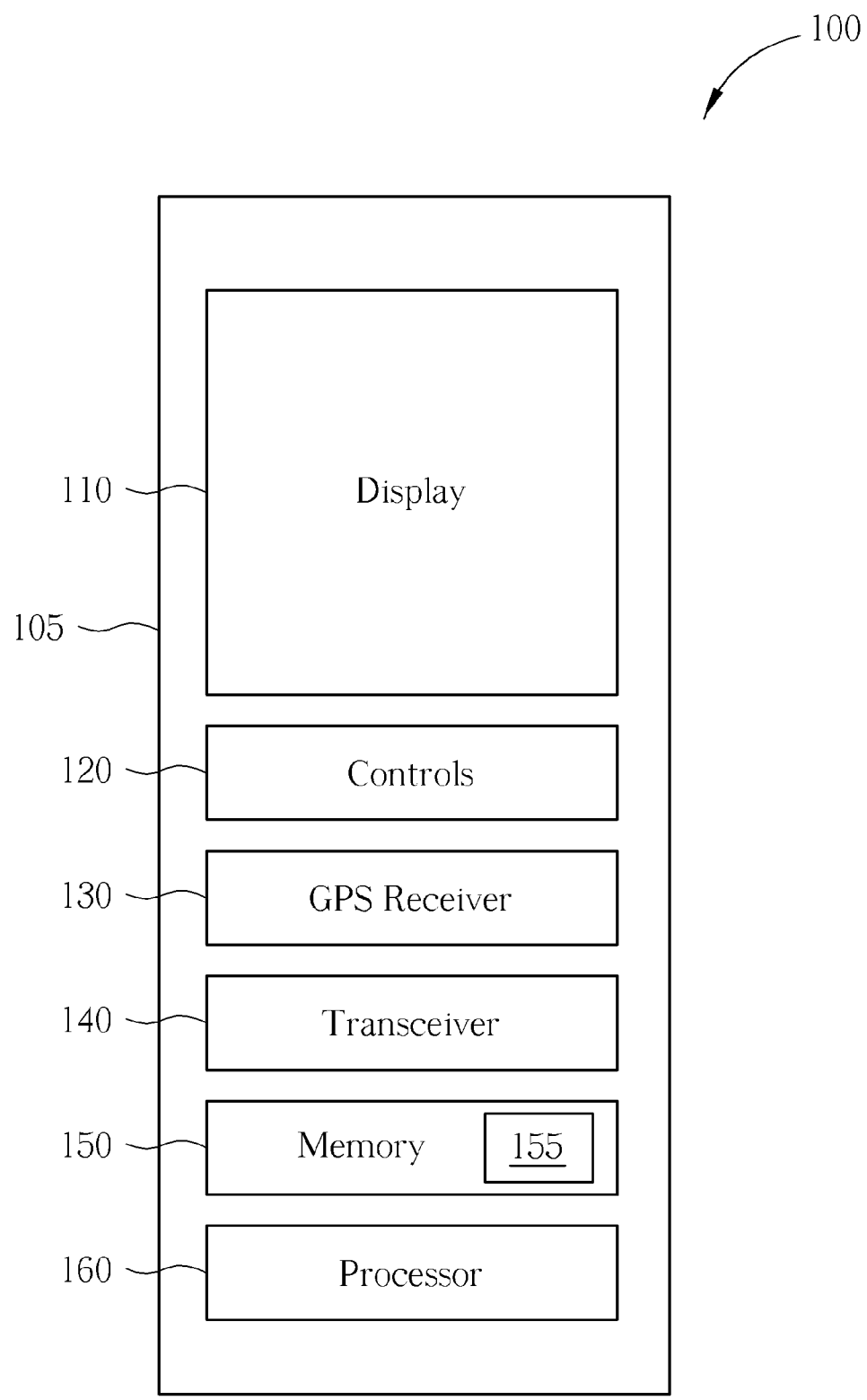
FIG. 3 is a block diagram of a mobile device according to an embodiment of the application.

Please refer to FIG. 3, which illustrates one embodiment of a mobile device 100 suitable for use in the network systems 10, 12. The mobile device 100 may include a frame 105 housing a display 110, control surfaces or buttons 120 for user control of the mobile device 100, a GPS receiver similar to the GPS receivers 22, 32, a transceiver 140 for communicating with the base station 40, a memory 150 for storing program code 155 that may be executed by the processor 160 for controlling operations of the mobile device 100. The memory 160 may further comprise program code 155 for execution by the processor 160 to provide the GPS management system disclosed here within. The GPS management system may accept alternate user input in place of the buttons 120 in some embodiments where the display 110 is a touch or multi-touch screen.

Figure 4:
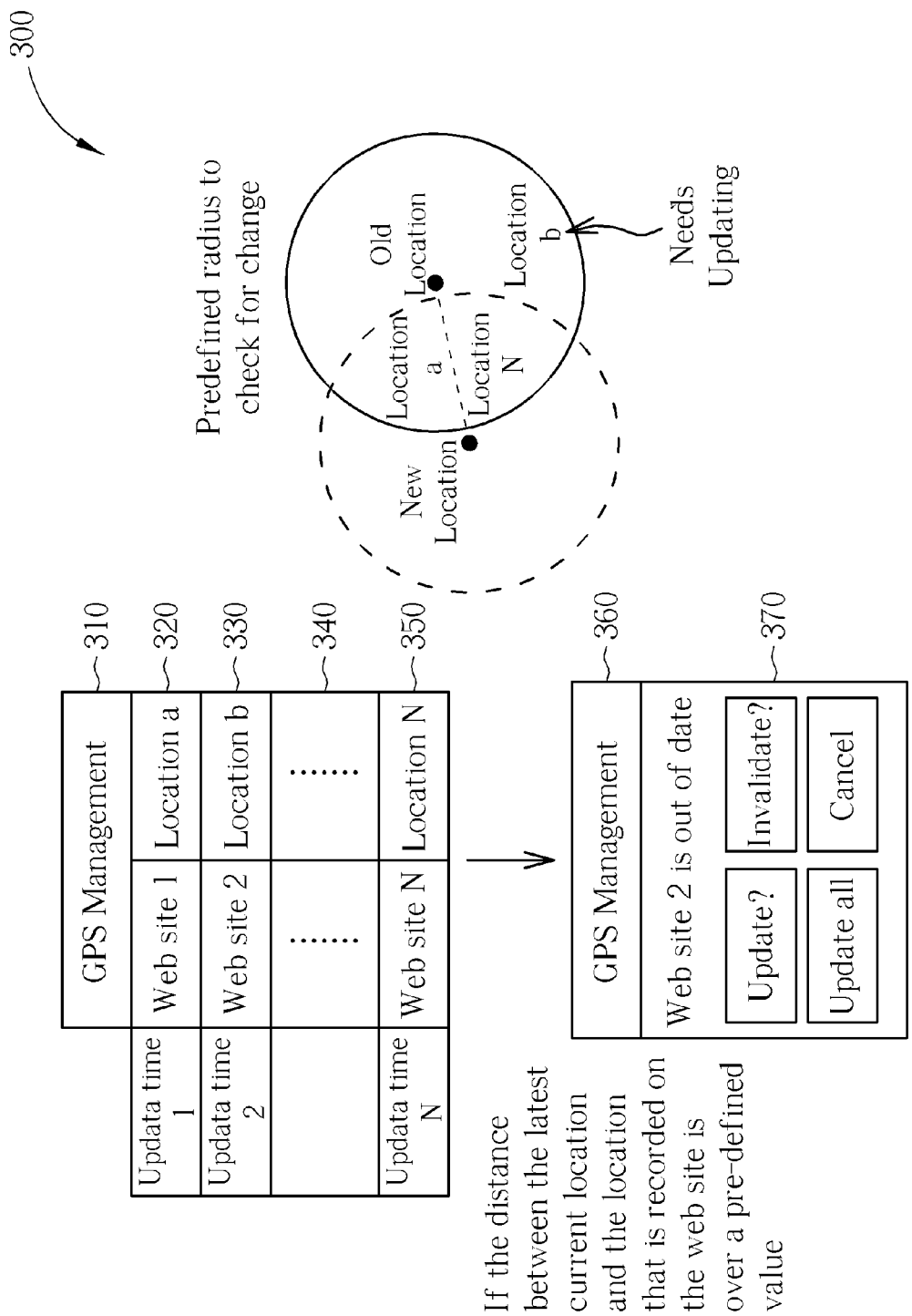
FIG. 4 is a diagram illustrating functionality of the mobile device of FIG. 3.

FIG. 4 illustrates one possible screen implementation of the GPS management system 300 applied to a mobile device 20, 30. Shown on the display 110 of the mobile device 20, 30 is presented to the user a screen that may include the name 310 and/or portion of the application being displayed, and a list 320, 330, 340, 350 of websites, the time the website was last updated, and the corresponding location currently displayed at that website. For example in list item 320, website 1 currently shows that the user (or more precisely the GPS receiver 22, 32 in the mobile device 20, 30 running the GPS management system 300) last updated website 1 via a browser with a first command to edit a user location information on the network interface based on geo-information generated by the GPS receiver 22, 32 as having a current location of "a". Because not all of the websites in the list 320, 330, 340, 350 were open in the browser of the mobile device 20, 30 simultaneously and the first command to edit a user location information on the network interface may only be transmitted to websites that are currently open in the browser, the different websites may possibly show different locations, although not necessarily so.

On the right side of FIG. 4 is an illustration to aid in the understanding of a part of the disclosure defining when a location shown on the website is considered by the GPS management system 300 as being current or invalid (out-of-date). The decision method involves movement of the mobile device 20, 30 greater than a predetermined distance (radius) from the location stored corresponding to the website. In the drawing, assume that the mobile device 20, 30 is currently at "Old Location". The solid circle surrounding "Old Location" has a radius of the predetermined distance. At this time, because locations "a" (shown at website 1), "b" (shown at website 2), and "N" (shown at website N) remain within the solid circle, the predetermined distance has not been exceeded and the GPS management system 300 considers these all as valid locations and no updates are necessary.

However, suppose that the user then moves the mobile device 20, 30 to "New Location". A new broken-line circle having the same radius is shown encompassing the new "valid location" area. As can be seen, locations "a" and "N" remain within the new circle so are still considered valid locations. However, in this example, location "b", shown at website 2 is now outside of the circle and therefore considered invalid by the GPS management system 300 and needs updating.

One may have to have current access to the websites in the list to update the current location shown at that website, but whether or not access to any of the websites in the list is currently available, the GPS management system 300 periodically compares current geo-information generated by the GPS receiver 22, 32 in the mobile device 20, 30 to the location indicated by the most recent first command to edit a user location information on the network interface sent to each of the websites in the destination list. The most recent command to edit a user location information on the network interface sent to a specific website may possibly be obtained by accessing and reading the information at that specific website, but preferably is stored in the destination list maintained by the GPS management system 300. Whenever the difference between current geo-information generated by the GPS receiver 22, 32 in the mobile device 20, 30 and the location indicated by the most recent first command to edit a user location information on the network interface sent to each of the websites in the destination list is greater than the predetermined amount, the GPS management system 300 considers the location shown at that website as being invalid and requiring updating, either by uploading a new current location or simply invalidating (perhaps simply saying "Location Unknown") the location at that website.

Users of the GPS management system 300 do not necessarily want to be tracked all the time, but also may want to make sure that the information displayed on the websites in the destination list is not inadvertently wrong. Therefore, some embodiments of the GPS management system periodically update one or more of the websites in the list to reflect the correct location without determining the distance between the current location and the previous updated location. Other embodiments of the GPS management system 300 do not necessarily periodically update location information at the website, but instead upon determining that the location shown at a website is invalid, will update the location shown at that website. Other embodiments of the GPS management system 300 periodically update locations shown at websites in the list without determining the distance between the current location and the previous updated location, and may additionally update location information at websites upon determining that the location shown at the website is invalid. Some embodiments of the GPS management system 300 will display a message to the user such as is shown in the bottom left of FIG. 3. This example message may include the name 360 and/or portion of the application being displayed, the specific message (Website 2 is out of date), and a list of possible options such as "update", "invalidate", "update all" which updates all websites in the list considered by the application to have invalid location information to the most current geo-information, and "cancel", which of course cancels the update for that website. The GPS management system then proceeds appropriately according to the user's response.

The list of websites 320, 330, 340, and 350 shown in FIG. 3 is maintained by the GPS management system 300 in at least one destination list. Those skilled in the art will recognize that there are many database or other methods to maintain such a list or lists and the example implementation 400 shown in FIG. 4 is to aid in the understanding of the disclosure, and the present application is in no way limited to only the illustrated example.

Figure 5:
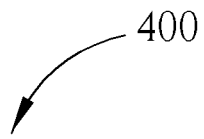
FIG. 5 illustrates a destination list according to an embodiment of the application.

As FIG. 5 shows, the destination list may be a list of simple tables, each including at least the network address (URL) for the corresponding website that displays the user's current location. The table may also include other website relevant information such as log-in data (user name and/or password), location data type (whether exact location such as latitude/longitude or approximate information (such as city name or a location like "work" or "home" is displayed), currently displayed location, update distance for this specific website, an update message meaning what to display when the website is updated, for example the new location or perhaps a message like "currently unknown", and other fields according to design consideration. All fields except the network address field may include default values set by global user preferences which can be overridden if input or selected by the user.

The network address field may be filled in at least two ways. In some embodiments, the GPS management system 300 comprises a menu or button that adds a website currently open in the browser to the destination list. In other embodiments, the GPS management system 300 is aware of when a first command to edit a user location information on the network interface comprising geo-information is being transmitted via the browser to a website, and when determined that the first command to edit a user location information on the network interface is being transmitted, checks the destination list to see whether this network address is already present. When the current network address is not already present in the destination list, the GPS management system 300 according to the embodiment either automatically enters the transmission destination network address into the destination list or displays a message asking the user whether the current website should be added to the destination list and adds or does not add this network address to the destination list according to the response of the user.

Figure 6:
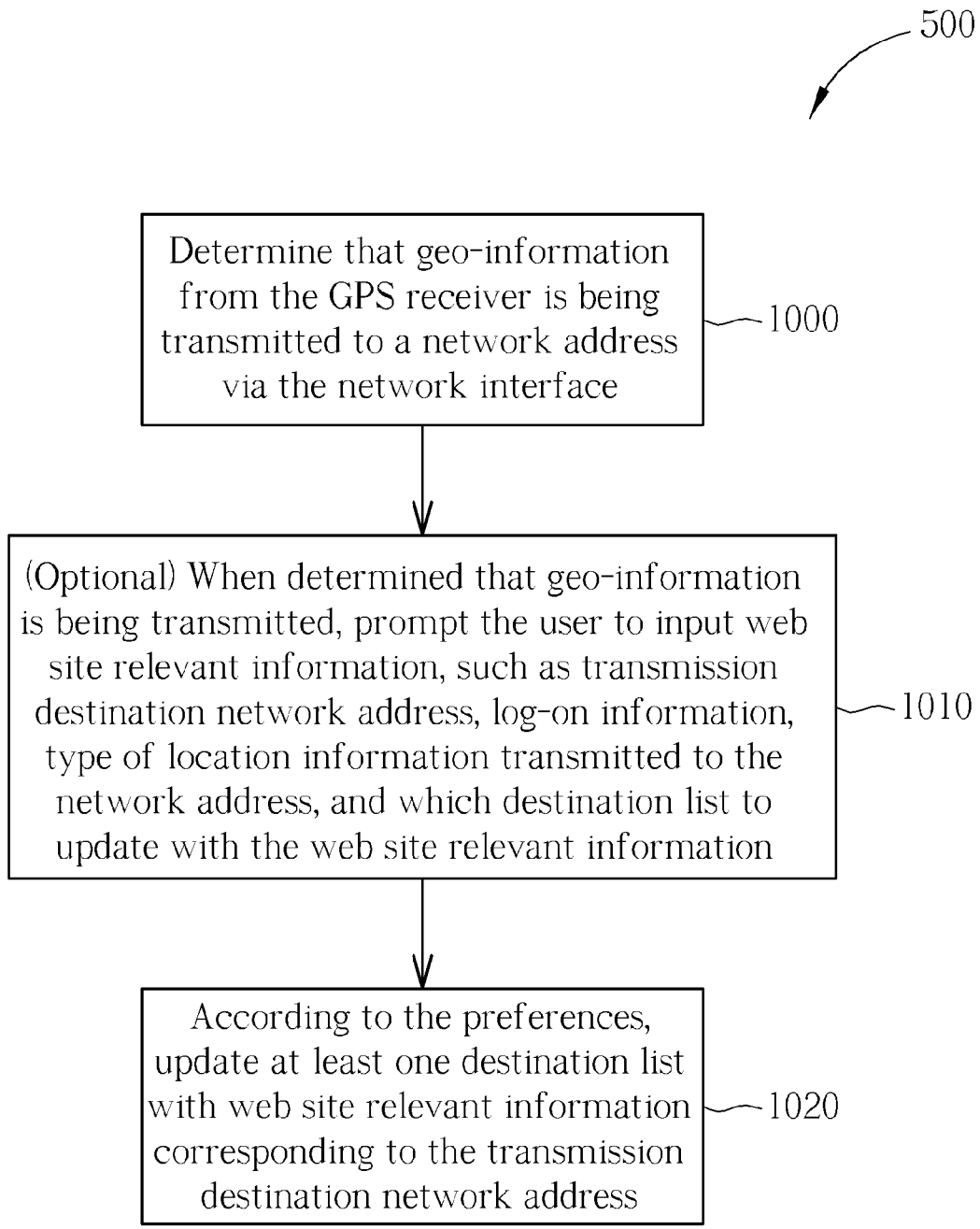
FIG. 6 is a flowchart of updating the GPS management system according to an embodiment of the application.

FIG. 6 is a flowchart of the process of adding or updating the destination list according to an embodiment of the disclosure. The process includes at least the following steps.

Step 1000: Determine that geo-information from the GPS receiver is being transmitted to a network address via the network interface.

Step 1010: (Optional) When determined that geo-information is being transmitted, prompt the user to input website relevant information, such as transmission destination network address, log-on information, type of location information transmitted to the network address, and which destination list to update with the website relevant information.

Step 1020: According to the preferences, update at least one destination list with website relevant information corresponding to the transmission destination network address.

Updating at least one destination list includes at least two possibilities. If the network address is not already present, add the network address to the destination list. If the network address is already present, update the current location field according to the first command to edit a user location information on the network interface being transmitted to the website at that network address.

It should be noted that the present disclosure is intended to possibly include provisions for the GPS management system 300 to maintain a history of all commands transmitted to each network address so that a tracking history may be displayed when desired by the user. It also should be noted that the GPS management system 300 is not limited to only a single destination list, but may simultaneously maintain as many overlapping and non-over-lapping lists as required and assigned by the user. For example, maintaining separate destination lists comprising possibly different websites enables the user to possibly display different information on different websites or prioritizing updates of the websites. For example, a first destination list may contain websites accessible only to family members or close friends and a second destination list may contain websites accessible to the general public. In this scenario, the user could modify preferences so that the first destination list is using a smaller change in predetermined distance, more specific location information, and/or is given priority in that websites in the first destination list are updated sooner and differently than those websites in the second destination list.

Figure 7:
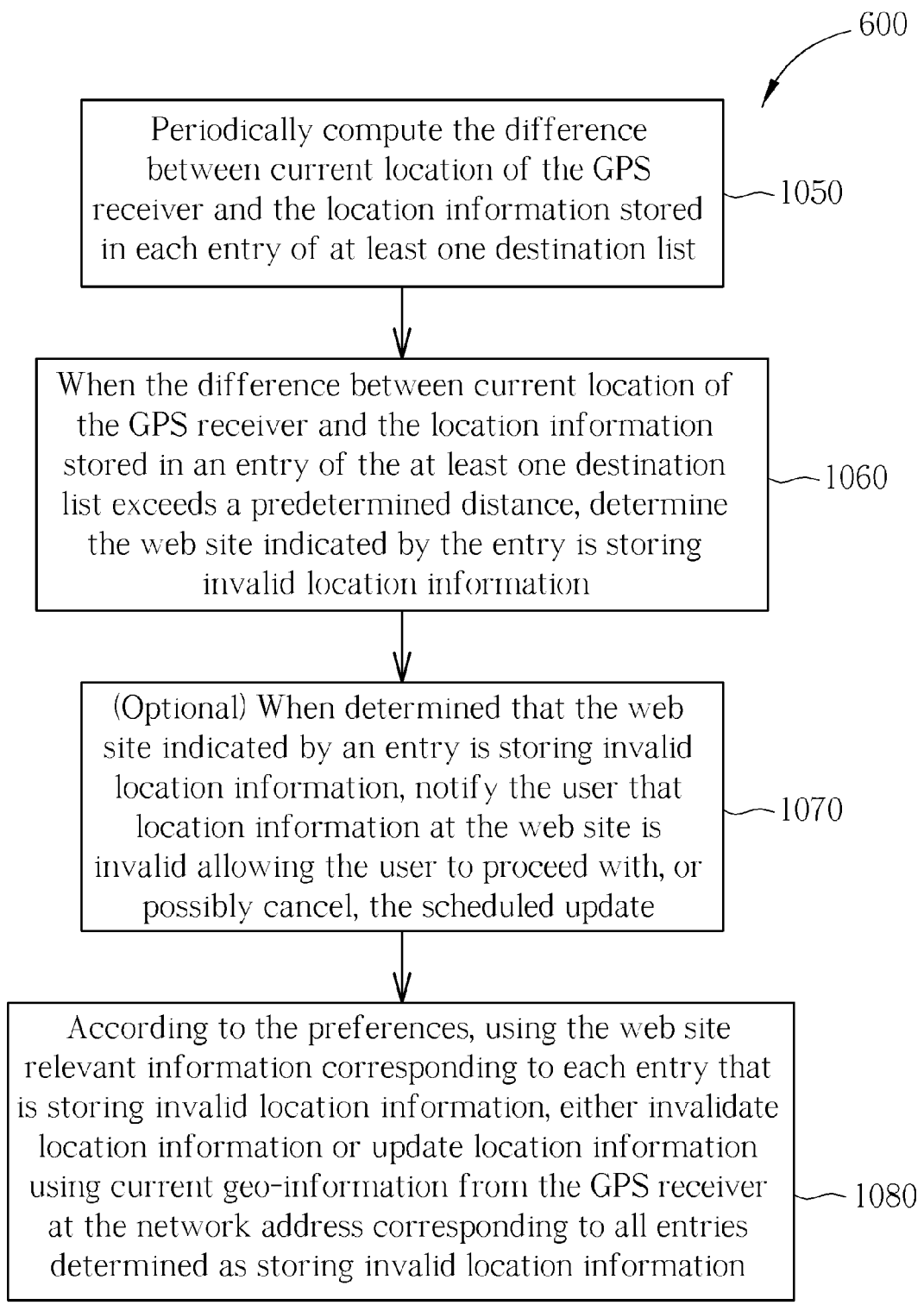
FIG. 7 is a flowchart of the GPS management system updating location information at networked websites according to an embodiment of the application.

FIG. 7 is a flowchart of the process of adding or updating websites in the destination list according to an embodiment of the disclosure. The process includes at least the following steps.

Step 1050: Periodically compute the difference between current location of the GPS receiver and the location information stored in each entry of at least one destination list.

Step 1060: When the difference between current location of the GPS receiver and the location information stored in an entry of the at least one destination list exceeds a predetermined distance, determine the website indicated by the entry is storing invalid location information.

Step 1070: (Optional) When determined that the website indicated by an entry is storing invalid location information, notify the user that location information at the website is invalid allowing the user to proceed with, or possibly cancel, the scheduled update.

Step 1080: According to the preferences, using the website relevant information corresponding to each entry that is storing invalid location information, either invalidate location information or update location information using current geo-information from the GPS receiver at the network address corresponding to all entries determined as storing invalid location information.

In step 1080, a second command to edit a user location information on the network interface based on current geo-information from the GPS receiver is sent to each network address in the destination list only when respective locations indicated in the first geo-information (location stored in the destination list) and second geo-information (current location) differ by a predetermined amount. The second command to edit a user location information on the network interface could be a new location based or possibly an instruction to simply erase the old location from the corresponding website.

Depending on the embodiment and preferences, the GPS management system can prompt the user to add websites to the system when geo-information is being uploaded, or automatically add the same websites when the system determines that geo-information is being uploaded, and can prompt the user to update websites when the GPS management system determines that location information at the websites is invalid, or automatically update the same websites having invalid location information and all combinations of these possibilities is within the scope of the current disclosure.

Figure 8:
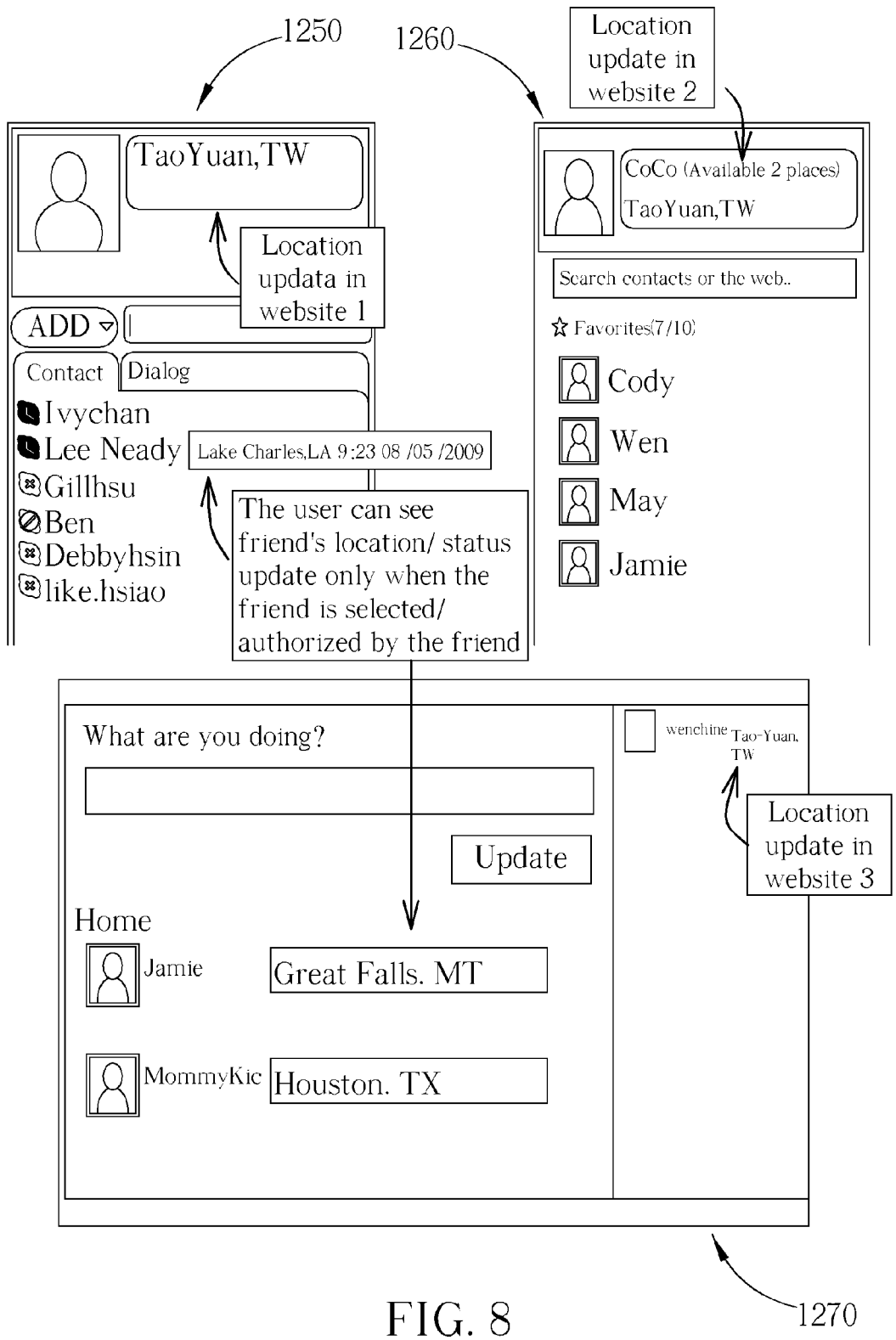
FIG. 8 is illustrates possible networked websites according to an embodiment of the application.

Please refer now to FIG. 8, which shows three examples of ways the application described above may display websites on a screen of a mobile device according to various embodiments of the invention. Example 1250 shows website 1 being displayed. In the top-right corner of the displayed image may be an indication of the current location of the mobile device as previously stored at website 1, or alternately or in addition show the location which website 1 could be updated to reflect due to movement of the mobile device since the last update. A third alternative is to show when a contact's location information has been updated. As is common with social networking or messenger-like applications, a list of friends or contacts may also be displayed. In keeping with the invention, alongside each of the contact names, the location of that contact's mobile device as stored at website 1 may be visible. Application setting can determine whether or not location information is not displayed at all, always displayed, or displayed only when the contact is selected or perhaps only during a mouseover of the contact's name. Also in keeping with the invention, location information is only available on a restricted basis, meaning that for a user to see a contact's location information, the contact must have previously authorized the user to view their information and visa versa. Methods of authorization are not central to the current application and will not be detailed here, but may take a form similar to making "friends" on social networking sites. Such authorization is stored either at the website or in the local settings in the mobile device.

Example 1260 is similar to example 1250 but shows that the user (CoCo) is presently showing two different location information at various websites, with the current website 2 listing her location as Taoyan, Taiwan. Multiple locations are possible if the user chooses not to update specific websites and moves the mobile device. Example 1270 is a third example showing current locations of two contacts that have authorized the user to receive their respective location information. It is noted that examples 1250, 1260, and 1270 are for illustrative purposes to aid in the understanding of the invention and are in no way limiting to these features or functions.

Figure 9:
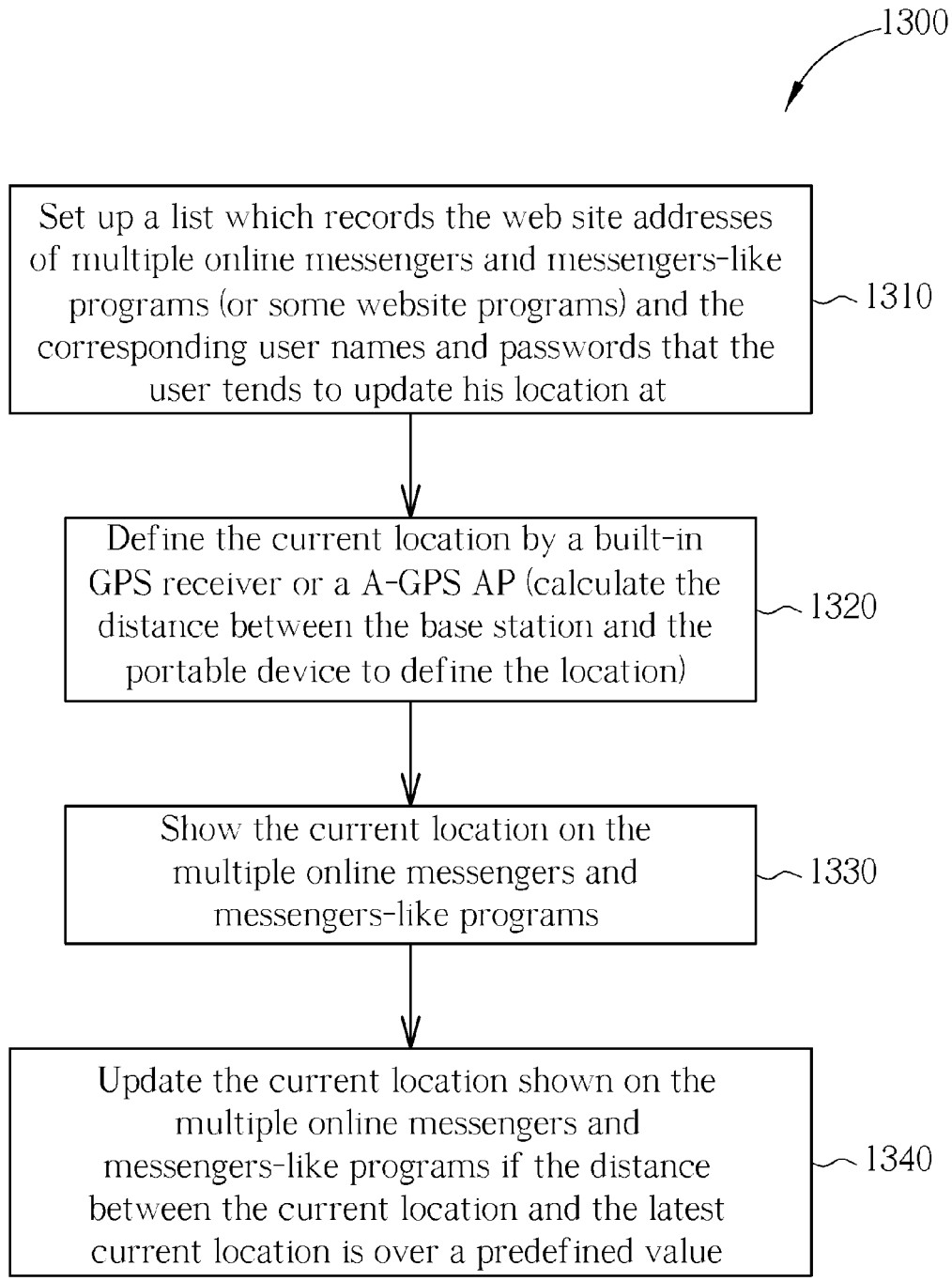
FIG. 9 is a flowchart of an embodiment of the application.

Please refer now to FIG. 9, which is a flowchart 1300 of the present application that includes:

Step 1310: Set up a list which records the web site addresses of multiple online messengers and messengers-like programs (or some website programs) and the corresponding user names and passwords that the user tends to update his location at.

Step 1320: Define the current location by a built-in GPS receiver or an assisted GPS application program (A-GPS AP) (calculate the distance between the base station and the portable device to define the location).

Step 1330: Show the current location on the multiple online messengers and messengers-like programs.

Step 1340: Update the current location shown on the multiple online messengers and messengers-like programs if the distance between the current location and the latest current location is over a predefined value.

Only selected contacts are allowed to see the location update in the website programs or online messengers, the mobile device can access the Internet via GPRS, WIFI, 3G, 3.5G, 4G and other known methods. The mobile device might offer a map for a user to check their current location or the location of one of their contacts, the mobile device might be a personal navigation device, a mobile phone, a netbook or other computer, or any other mobile device capable of contacting the Internet, and the predefined distance between an old location and a current location that triggers a location update can be adjusted by the user.

The present application provides a simpler method of ensuring that user location information displayed on one or more websites does not become inadvertently incorrect when the user is not actively connected to the website hosting user location information. The GPS management system may be a stand alone application or a plug-in to a browser or other software and discloses a GPS management system applied to a mobile device for use in networked environment, or may be located on a remote server having access to the Internet websites and also wireless access to the mobile device in another embodiment.

Those skilled in the art will readily observe that numerous modifications and alterations of the device and method may be made while retaining the teachings of the invention.

What is claimed is:

1. A method applied to a mobile device comprising a GPS receiver having access to a network interface, the method comprising:

updating a destination list with transmission destination network address information when transmitting via the network interface a first command to edit a user location information on the network interface based on a first geo-information from the GPS receiver;

transmitting via the network interface a second command to edit the user location information on the network interface based on a second geo-information from the GPS receiver to each network address in the destination list only when respective locations indicated in the first and second geo-information differ by a predetermined distance;

when determined that geo-information is being transmitted, storing in the destination list a current location based on the first geo-information from the GPS receiver, wherein the destination list is stored in a memory comprised by the mobile device;

determining whether a transmission destination network address is already present in the destination list;

adding the transmission destination network address to the destination list when not already present in the destination list;

periodically computing a difference between current location of the GPS receiver and location information stored in each entry of the destination list; and when the difference between the current location of the GPS receiver and the location information stored in the entry of the destination list exceeds a predetermined distance, determining a website at the transmission destination network address indicated by the entry is storing invalid location information.

2. The method of claim 1 further comprising when determined that geo-information is being transmitted, prompting the user to input and store in the destination list website relevant information including information required for log-on to the website hosted at the transmission destination network address.

3. The method of claim 1 further comprising when it is determined that the website at the transmission destination network address indicated by the entry is storing invalid location information, transmitting via the network interface the second command to edit the user location information on the network interface to update location information.

4. The method of claim 1 further comprising when it is determined that the website at the transmission destination network address indicated by the entry is storing invalid location information, transmitting via the network interface the second command to edit the user location information on the network interface to erase location information.

5. The method of claim 1 further comprising when it is determined that the website at the transmission destination network address indicated by the entry is storing invalid location information, updating the destination list to comprise current location data to be based on current location of the GPS receiver.

6. An application embodied in a non-transitory computer readable medium executed by a processor of a mobile device having a GPS receiver or an A-GPS AP for performing the following steps:

setting up a destination list which records addresses of multiple websites and corresponding user names and passwords used to gain access to the multiple websites;

defining a current location of the mobile device according to information from the GPS receiver or A-GPS AP;

transmitting the current location of the mobile device to the multiple websites;

defining a new current location of the mobile device according to new information from the GPS receiver or A-GPS AP;

updating the current location previously transmitted to the multiple websites to be the new current location when a distance between the current location and the new current location is over a predefined value;

when determined that geo-information is being transmitted, storing in the destination list a current location based on the first geo-information from the GPS receiver, wherein the destination list is stored in a memory comprised by the mobile device;

determining whether a transmission destination network address is already present in the destination list;

adding the transmission destination network address to the destination list when not already present in the destination list;

periodically computing a difference between current location of the GPS receiver and location information stored in each entry of the destination list; and when the difference between the current location of the GPS receiver and the location information stored in the entry of the destination list exceeds a predetermined distance, determining a website at the transmission destination network address indicated by the entry is storing invalid location information.

7. The application of claim 6 wherein the application further displays a list of contacts associated with each of the multiple websites and when accessing one of the multiple websites, the application accesses from said one of the multiple websites and displays location information for each contact in the associated list that the application is authorized to access.

8. The application of claim 7 wherein said one of the multiple websites is a messenger or messenger-like program.

9. The application of claim 7 further comprising generating a map on a display of the mobile device indicating location of the mobile device or location of a contact.

10. The application of claim 6 further comprising adjusting the predefined value by a user of the mobile device.

* * * * *